Figure 1:
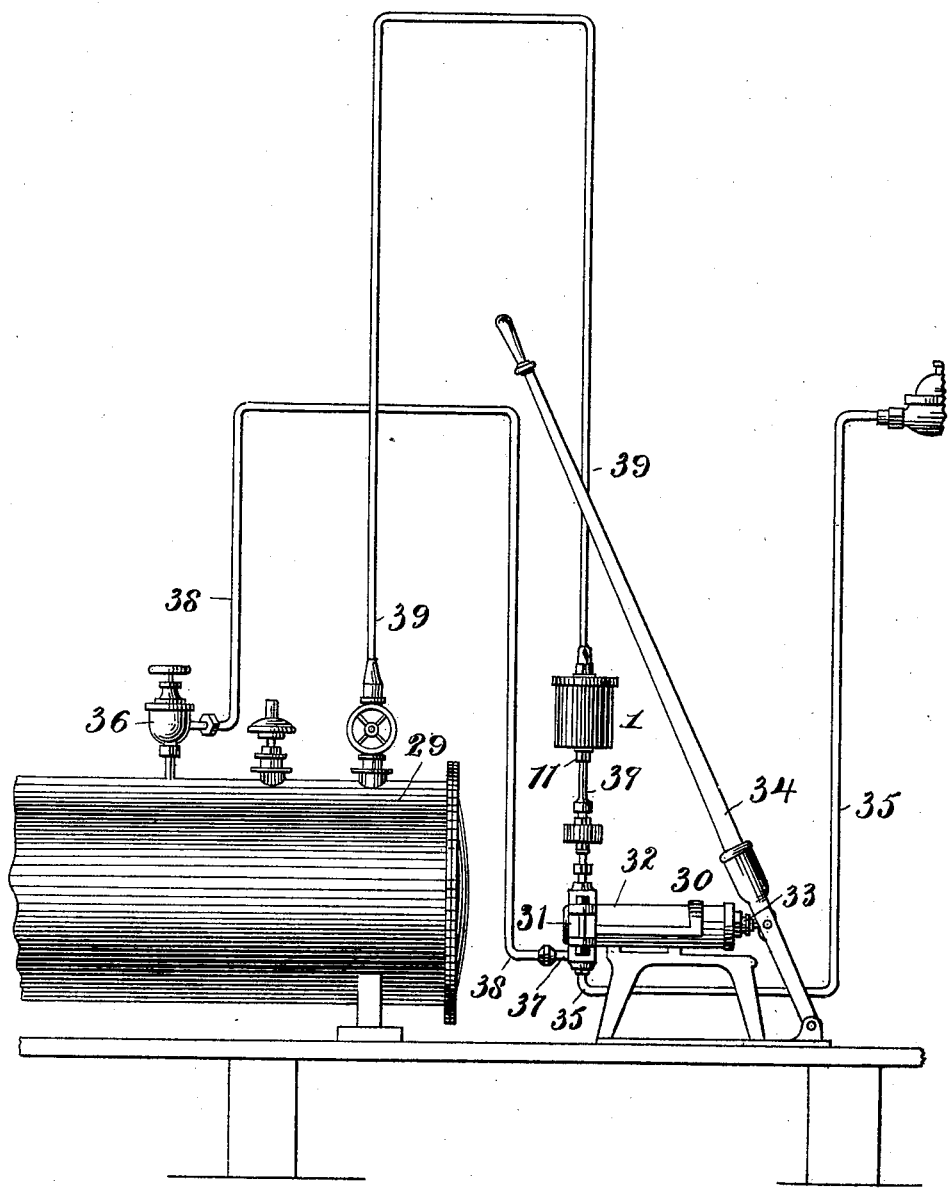

No. 635,864. Patented Oct. 31, 1899.
P. E. MALMSTROM.
FILTERING DEVICE.
(Application filed June 1, 1898.)
(No Model.) 2 Sheets—Sheet 2.
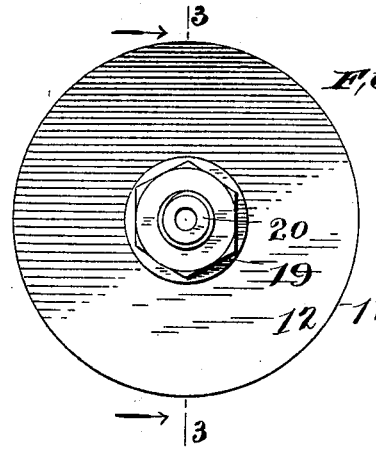
Fig. 2.
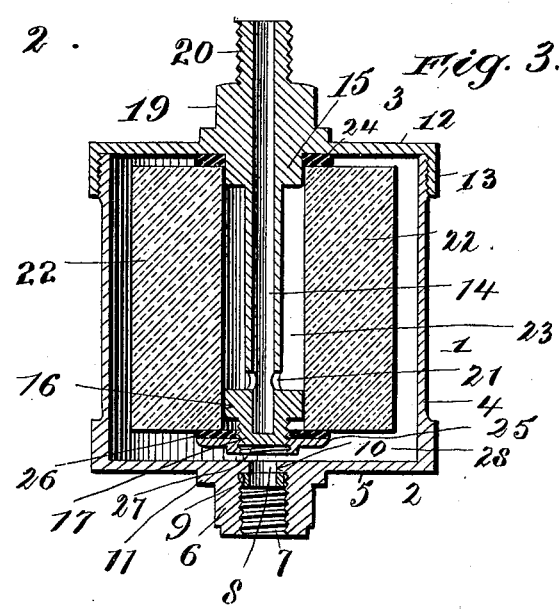
Fig. 3.
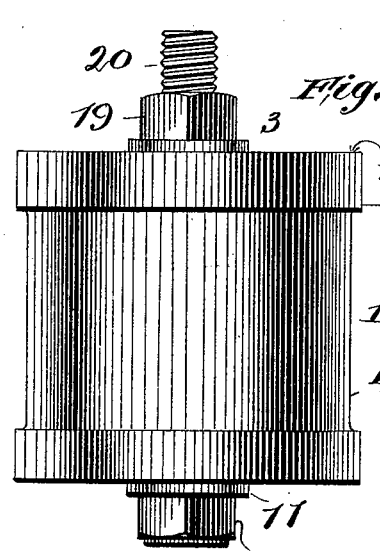
Fig. 4.
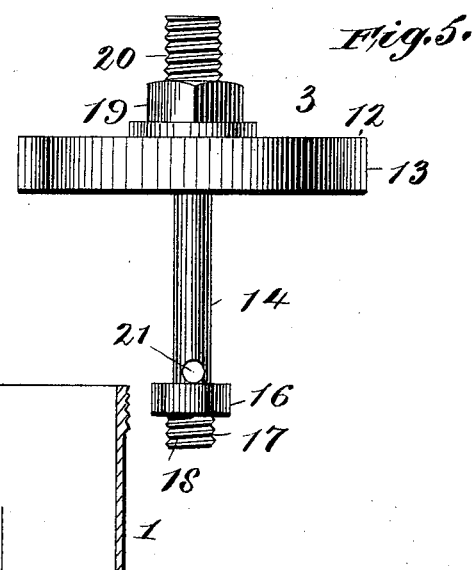
Fig. 5.
Fig. 6.
WITNESSES
C. W. Benjamin
Wm. Jacobsen
INVENTOR
Peter E. Malmstrom
BY
Joseph L. Levy
ATTORNEY
THE NORRIS PETERS CO., PHOTO-LITHO., WASHINGTON, D. C.

UNITED STATES PATENT OFFICE.

PETER E. MALMSTROM, OF NEW YORK, N. Y., ASSIGNOR TO THE DIAMOND SODA WATER MANUFACTURING COMPANY, OF SAME PLACE.

FILTERING DEVICE.

SPECIFICATION forming part of Letters Patent No. 635,864, dated October 31, 1899.

Application filed June 1, 1898. Serial No. 682,259. (No model.)

*To all whom it may concern:*

Be it known that I, PETER E. MALMSTROM, a citizen of the United States, residing in the city, county, and State of New York, have invented certain new and useful Improvements in Filtering Devices, of which the following is a specification.

My invention relates, primarily, to filters mainly intended for use in manufactories where a constant supply of water is at hand, although the same can be used in isolated plants, such as in private houses and the like.

My invention also relates to a filtering device especially adapted for use in connection with an apparatus for carbonating liquids.

A filter made in accordance with my invention comprises a filter-case, a filtering-body or filtrant, and a combined supporting-stem for the filtrant and exit-tube, to which the filtrant is detachably secured.

The main object of my improvements in this regard is to provide means for detachably securing the filtrant within the filter-case, so as to allow of its ready removal for the purpose of cleaning or supplying a new filtrant, and also means for packing the joint between the filtrant and the supporting and exit stem.

In the employment of filters in connection with carbonating apparatus considerable difficulty has been encountered owing to the gas in the carbonated liquid during the passage of the liquid through the filter rising up and passing through the filter without passing through the filtrant, the gas then preceding the liquid, which is to a certain extent relieved of the pressure of the gas, which should be employed to aid the pressure derived from other sources in forcing carbonated liquid through the filtering media.

I so construct my filter that when it is employed in connection with the carbonating apparatus the gas must pass through the filtering media before it can take its exit from the filter, the liquid and gas passing through the filtering media substantially contemporaneously, thereby not only properly filltering the liquid, but purifying the gas as well.

My invention therefore resides in the construction and combination of devices hereinafter described and further pointed out in the claims.

In the drawings forming part of this application, Figure 1 is a diagrammatic illustration of a carbonating apparatus, showing the means of employing my improved filter in connection therewith. Fig. 2 is a plan view of the filter-casing enlarged and detached. Fig. 3 is a sectional elevation of the filter-casing and the contained filtering construction, the section being taken approximately on the line 3 3, Fig. 2. Fig. 4 is a side elevation of Fig. 2. Fig. 5 is a side elevation of the cap of the casing and the exit and supporting tube, and Fig. 6 is a central sectional elevation of the lower section of the casing.

Similar numerals of reference indicate corresponding parts throughout the several views.

I shall first describe the construction of my filter and then its application to general use and also its application to a carbonating apparatus.

At 1 is the filter, which comprises two separable parts 2 3, the lower part comprising the cylindrical casing 4, having a bottom 5, from which projects an apertured lug 6, the lower aperture 7 being interiorly screw-threaded, the other and upper aperture 8 passing through the bottom 5 of the casing. A washer 9 is located against the shoulder 10, formed by the respective apertures; the exterior of the lug 6 being squared to form a nut 11, the upper section 3 of the casing comprising a top disk 12 and a downwardly-extending annular projection 13, provided with an interior screw-thread adapted to engage a screw-thread on the upper section of the casing 4, thereby detachably securing the two casing-sections together. Depending from the top 12 of the upper section is a tube 14, reduced in diameter intermediate of its ends to form an interior annular shoulder 15 at the point of juncture of the tube and the top 12 of the casing-section 3 and at the bottom an annular flange 16, the lower end 17 of the tube being slightly enlarged over the main body of the tube, but of smaller diameter than the annular flange 16, the bottom of the tube end or projection 17 being imperforate, and on its exterior a screw-thread 18 is formed. The bore within the tube is continued upwardly through the top 12 of the casing-section, a squared projection or nut 19 being formed on the exterior of the casing-section, and projecting upwardly from the nut is a screw-threaded projection 20, in which the bore of the tube 14 is continued.

The intermediate section—viz., between parts 15 16—of the tube 14 is provided with holes 21, which, for a purpose hereinafter described, I prefer to locate at the sealed extremity of the tube, which in the present case is just above the annular flange 16.

At 22 is the filtrant or filtering medium, which is barrel-shaped, with an internal bore 23 of a size adapting it to fit over the annular shoulder and flange 15 16, leaving a space between them and the tube 14. To secure the filtrant 22 in position, it is passed over the tube 14, its inner bore bearing against the annular shoulder 15 and flange 16.

Before placing the filtrant 22 on the tube an elastic washer 24 is placed about the annular shoulder 15 and against the top 12 of the casing-section 3. When in this position, a screw-cap 25, having a superposed washer 26 and an internal thread 27, is screwed onto the threaded projection 17, forcing the washer 26 against the bottom of the filtrant, as shown in Fig. 3, and firmly securing the filtrant 22 in position and allowing it to be readily removed for cleaning purposes or renewal, the washer 24 being likewise forced against the top 12 of the section 3 and about the shoulder 15, packing the joints between the filter-bore 23 and the interior or receiving space 28 of the filter.

As will be observed by reference to Fig. 3, in order to remove the filtrant it is only necessary to unscrew the section 3 from 4, which will carry with it the suspended filtrant, allowing access thereto, and the filtrant can be readily detached from its support by unscrewing the cap 25.

For many purposes the tube 14 may be provided with a number of apertures, as 21, located anywhere along its length, or said apertures may take the form of a slot, either of which forms of opening being so proportioned as to allow of a ready exit of the filtered liquid from the filter, and when so employed—that is, in general use—it is not material to my invention whether the ingress to the filter is made through one end or the other. However, when employed in connection with a carbonating apparatus I prefer the following arrangement:

In Fig. 1 is diagrammatically illustrated a suitable carbonating apparatus in connection with which my present improvements may be advantageously employed, the apparatus being that described and illustrated in a patent granted to me on the 3d day of May, 1898, No. 603,404, in which 29 is the carbonating-cylinder and 30 a force-pump, the force-pump having a compression and commingling chamber 31 at one end and a barrel 32 and plunger 33, operated by a hand-lever 34, the compression-chamber 31 being placed in connection with a suitable supply of water, as by the pipe 35. At 36 is a controlling-valve leading from the carbonating-cylinder, which connects with the ingress-port 37 of the compression-chamber 31 of the pump by the pipe 38, to which the pipe 35, leading from the water-supply, also leads. At 39 is a pipe and associated devices leading back to the gas-space of the carbonating-cylinder, as illustrated in my patent before mentioned. This pipe leads from the exit and commingling chamber of the force-pump, and in this pipe I have located my filter in order to illustrate its operation in this connection. In the operation of this apparatus the commingled gas and water, then carbonated, passes out of the compression-chamber of the pump through the pipe 39 to the carbonating-cylinder. When used in this connection, I so connect the filter-case that the inlet 7 8 to the casing will be at the same end as the holes 21—that is to say, the inlet to the tube 14, leading to the outlet 20 from the filter, will be at the lowest point at which it would be practical to locate said holes and closely adjacent the inlet, which in this case would be through the apertured lug 6. The carbonated liquid would then pass into the casing under the pressure from the pump, the liquid being then forced to pass through the filtrant by the pressure from the pump, carrying with it its contained gas, which passes into the bore of the filtrant and then through the hole 21 in the exit-tube out of the filter and into the carbonating-cylinder 29 or elsewhere, as desired, the gas in the carbonated liquid being compelled to pass through the filtrant into the tube with the liquid instead of allowing it to become separated from the liquid and pass through the filter independently thereof. The location of the entrance into the exit-tube being below the level of the liquid in the casing, the gas rising up from the liquid above the level thereof, if the liquid should not completely fill the casing, is compelled to travel through the filtrant before it can find an exit therefrom through the exit-tube.

Having described my invention, I claim—

1. In a filter, the combination with a casing having an inlet through the center of its bottom, a cover detachably connected thereto, an outlet-tube made integral with said cover and projecting into said casing from the center of said cover, a shoulder formed on said tube just inside of said cover and a shoulder formed thereon near the lower end of said tube, the said tube closed at its lower end and screw-threaded below said lower lug, inlets into the bore of said tube between said lugs, a washer fitted on said upper lug just inside of said cover, a cap screwed on the lower end of said outlet-tube, a washer on the upper face of said cap, a filtrant having a bore substantially equal in diameter to that of said lugs, inclosing said exit-tube and supported between the said washer on the said upper lug and the washer on said cap, substantially as described.

2. In a filter, the combination with a casing having an apertured lug formed on its bottom at the center thereof, said lug being interiorly screw-threaded and squared outside to form a nut, the aperture therethrough forming the inlet into said filter, a cover detachably connected to said casing, an apertured lug formed upon the outside of said cover at the center thereof and integral therewith, and squared outside to form a nut, a tube formed integral with said cover extending into said filter and forming a continuation of the opening through the lug on the outside of said cover, said tube being closed at its lower end and provided with a lug at its upper end and one near its lower end, and having openings into the bore between said lugs, a cap screw-threaded on the lower end of said tube, and a filtrant held between said cap and the cover, washers being inserted between the cap and cover and the filtrant, said filtrant inclosing said outlet-tube, substantially as described.

Signed at the city, county, and State of New York this 31st day of May, 1898.

PETER E. MALMSTROM.

Witnesses:
B. S. WISE,
WM. JACOBSEN.